(12) United States Patent
Whitley

(10) Patent No.: US 6,830,422 B2
(45) Date of Patent: Dec. 14, 2004

(54) CONTAINER TRANSPORT APPARATUS

(75) Inventor: Adam Whitley, Miami Lakes, FL (US)

(73) Assignee: Allstate Storage, Inc., Miami Lakes, FL (US)

( * ) Notice: Subject to any disclaimer, the term of this patent is extended or adjusted under 35 U.S.C. 154(b) by 133 days.

(21) Appl. No.: 10/118,500

(22) Filed: Apr. 4, 2002

(65) Prior Publication Data

US 2003/0190221 A1 Oct. 9, 2003

Related U.S. Application Data

(60) Provisional application No. 60/281,658, filed on Apr. 5, 2001.

(51) Int. Cl.$^7$ ................................................. B60P 3/00
(52) U.S. Cl. ..................................................... 414/458
(58) Field of Search ........................................ 414/458

(56) References Cited

U.S. PATENT DOCUMENTS

| | | | | |
|---|---|---|---|---|
| 3,631,999 A | * | 1/1972 | Walerowski | ................. 214/390 |
| 3,749,363 A | * | 7/1973 | Hauser | ......................... 254/45 |
| 4,231,709 A | * | 11/1980 | Corsetti | ....................... 414/458 |
| 5,326,214 A | * | 7/1994 | Swisher, Jr. | ................. 414/495 |
| 5,800,114 A | * | 9/1998 | Secondi | ....................... 414/458 |
| 5,885,048 A | * | 3/1999 | Barth | .......................... 414/495 |

* cited by examiner

Primary Examiner—Steven A. Bratlie
(74) Attorney, Agent, or Firm—Robert M. Downey, PA

(57) ABSTRACT

A container transport apparatus for transporting a shipping container between two locations, such as between residences or business locations, includes a front unit and a separate rear unit for supporting the respective forward and rear ends of the shipping container. The front and rear units each include a frame structure with upper and lower hydraulically extendible vertical arm members. Locking pins on the vertical arm members engage sockets on the corners of the shipping container to facilitate vertical lifting and support of the container above the ground without tilting the container, thereby preventing damage to articles packed in the container. A forwardly extending trailer tongue on the front unit attaches to a hitch of a towing vehicle. The rear unit is provided with drive wheels and steering wheels for maneuvering the rear unit into position against the rear end of the container. The rear unit is also provided with inflated road tires to enable towing of the apparatus by a motor vehicle with or without a storage container supported between the front and rear units.

2 Claims, 12 Drawing Sheets

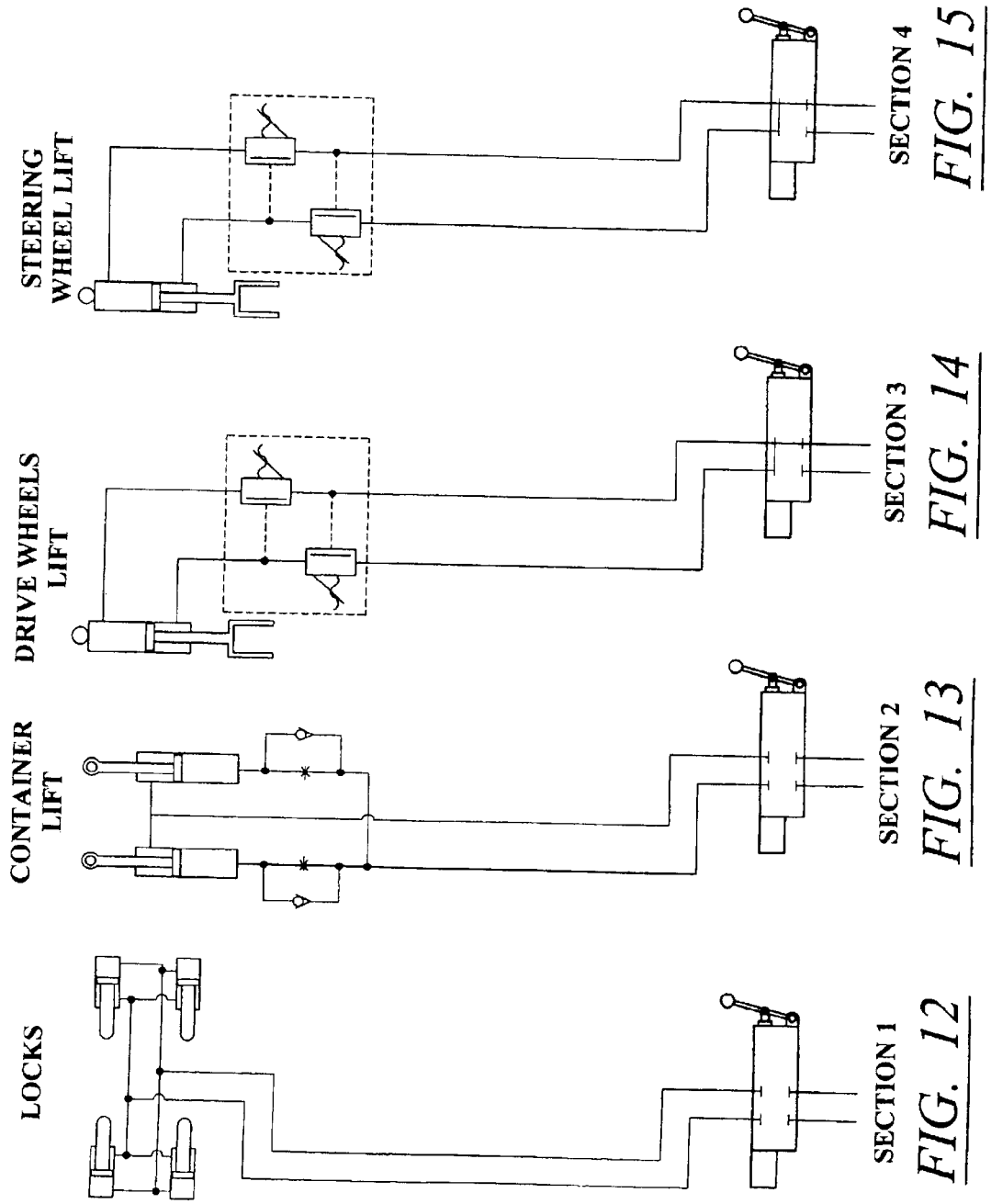

ns or business locations. The front and rear units each include a frame structure with upper and lower hydraulically extendible vertical arm members. Locking pins on the vertical arm members engage sockets on the corners of the shipping container to facilitate vertical lifting and support of the container above the ground without tilting the container, thereby preventing damage to articles packed in the container. A forwardly extending trailer tongue on the front unit attaches to a hitch of a towing vehicle. The rear unit is provided with drive wheels and steering wheels for maneuvering the rear unit into position against the rear end of the container. The rear unit is also provided with inflated road tires to enable towing of the apparatus by a motor vehicle with or without a storage container supported between the front and rear units. The apparatus includes a front unit and a separate rear unit. The front and rear units each include a frame structure with upper and lower hydraulically extendible vertical arm members. Locking pins on the vertical arm members engage sockets on the corner of the shipping container to facilitate vertical lifting and support of the container above the ground without tilting the container, thereby preventing damage to articles packed in the container. A forwardly extending trailer tongue on the front component attaches to a hitch of a towing vehicle. The rear component is provided with ground engaging wheels for towing the apparatus with or without a storage container supported between the front and units.

CONTAINER TRANSPORT APPARATUS

This application claims the benefit of Provisional Application No. 60/281,658, filed Apr. 5, 2001.

BACKGROUND OF THE INVENTION

1. Field of the Invention

The present invention relates to a container transport system and, more particularly, to an apparatus including separate front and rear units for lifting and supporting a shipping container above a ground surface for subsequent towing between two locations.

2. Discussion of the Related Art

Having to pack, transport and unload all of one's personal belongings (i.e., furniture, equipment, tools, clothing, etc.) when moving to a new residence or place of business can be extremely stressful and exhausting, particularly when attempting to do so in one day. Typically, when moving to a new address, articles or packages are hand carried, individually, onto a truck for transport from the old address to the new address. When each article is hand carried out of the old address, one or more individuals carrying the articles are required to lift the article or carry it up a ramp onto the truck. Once in the truck, the article is moved and manipulated into position in a manner which uses the space most efficiently. This process is repeated until all of the articles from the old address are packed onto the truck. During this entire packing process, the truck remains idle. Due to the significant daily expense in renting and/or operating the moving truck, there is a definite sense of urgency on the part of the movers to load the truck as quickly as possible, typically in less than one full day, so that the truck and moving crew can move on to the new address for unloading.

When arriving at the new address, the articles being transported are again individually carried off of the truck and into the new address. And, again, this laborious and exhausting task is carried out at a hurried pace so that the emptied truck can be returned or moved on to a new moving job on a cost-efficient schedule.

Unfortunately, in the hasty and somewhat careless process of loading and unloading a moving truck, furniture and other articles are sometimes damaged. Often, movers become fatigued, especially towards the end of the day, at which point mistakes are more likely to result in injury and damage to furniture and other valuable articles.

In view of the foregoing problems associated with moving furniture, equipment and other articles from one location to another, there remains an urgent need for a system and apparatus which enables a shipping container to be dropped off at a person's home or business and packed at a more leisurely, careful and less stressful pace, while permitting the transport vehicle to move on to another location so that revenues are not lost. More particularly, there is a need for a system and apparatus which can be used to transport a shipping container to a person's house or place of business, and to leave the shipping container on the ground to be filled at the person's leisure for subsequent moving to a new location. There is a further need for a system and apparatus which is able to lift the loaded container vertically without tilting the container and damaging the articles loaded therein, and to subsequently transport the container to a new address where it can be vertically lowered and placed on the ground for unloading at the person's leisure.

SUMMARY OF THE INVENTION

The present invention is directed to a container transport apparatus for transporting a shipping container between two

BRIEF DESCRIPTION OF THE DRAWINGS

For a fuller understanding of the nature of the present invention, reference should be made to the following detailed description taken in conjunction with the accompanying drawings, in which:

FIG. 12 is an isolated schematic diagram of the hydraulic locking mechanism used for locking the shipping container to the rear unit, wherein the hydraulic locking system is part of the hydraulic system shown in FIG. 11;

FIG. 13 is an isolated schematic diagram of the hydraulic lift mechanism forming a part of the hydraulic system of FIG. 11;

FIG. 14 is an isolated schematic diagram of the hydraulic drive wheel lift mechanism forming a part of the hydraulic system of FIG. 11;

FIG. 15 is an isolated schematic diagram of the hydraulic steering wheel lift mechanism forming a part of the hydraulic system of FIG. 11;

Like reference numerals refer to like parts throughout the several views of the drawings.

DETAILED DESCRIPTION OF THE PREFERRED EMBODIMENT

Figure 1:
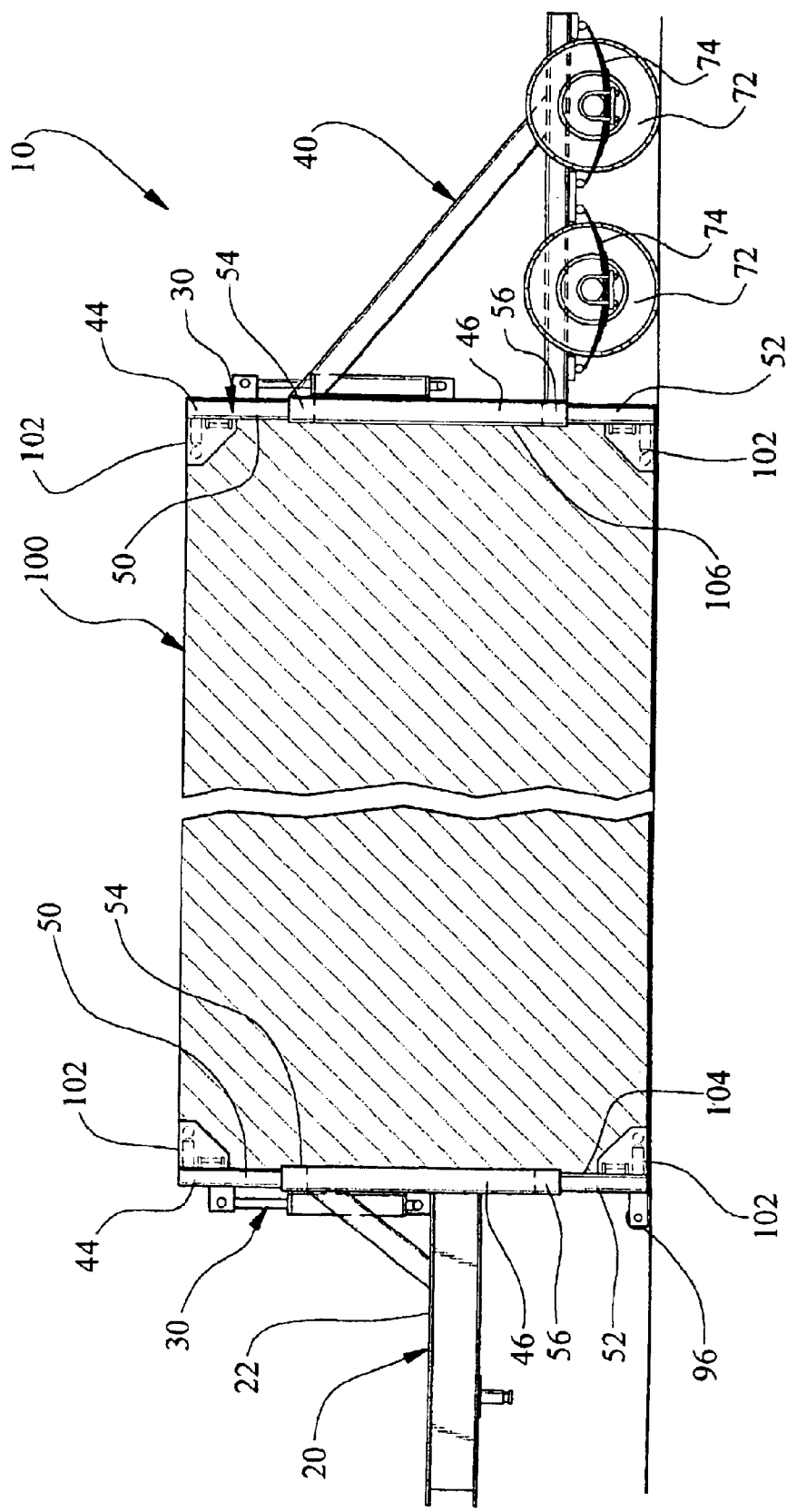
FIG. 1 is a side elevation, showing the front and rear units of the container transport apparatus attached to a shipping container in position to lift the shipping container above a ground surface for transport.
Figure 2:
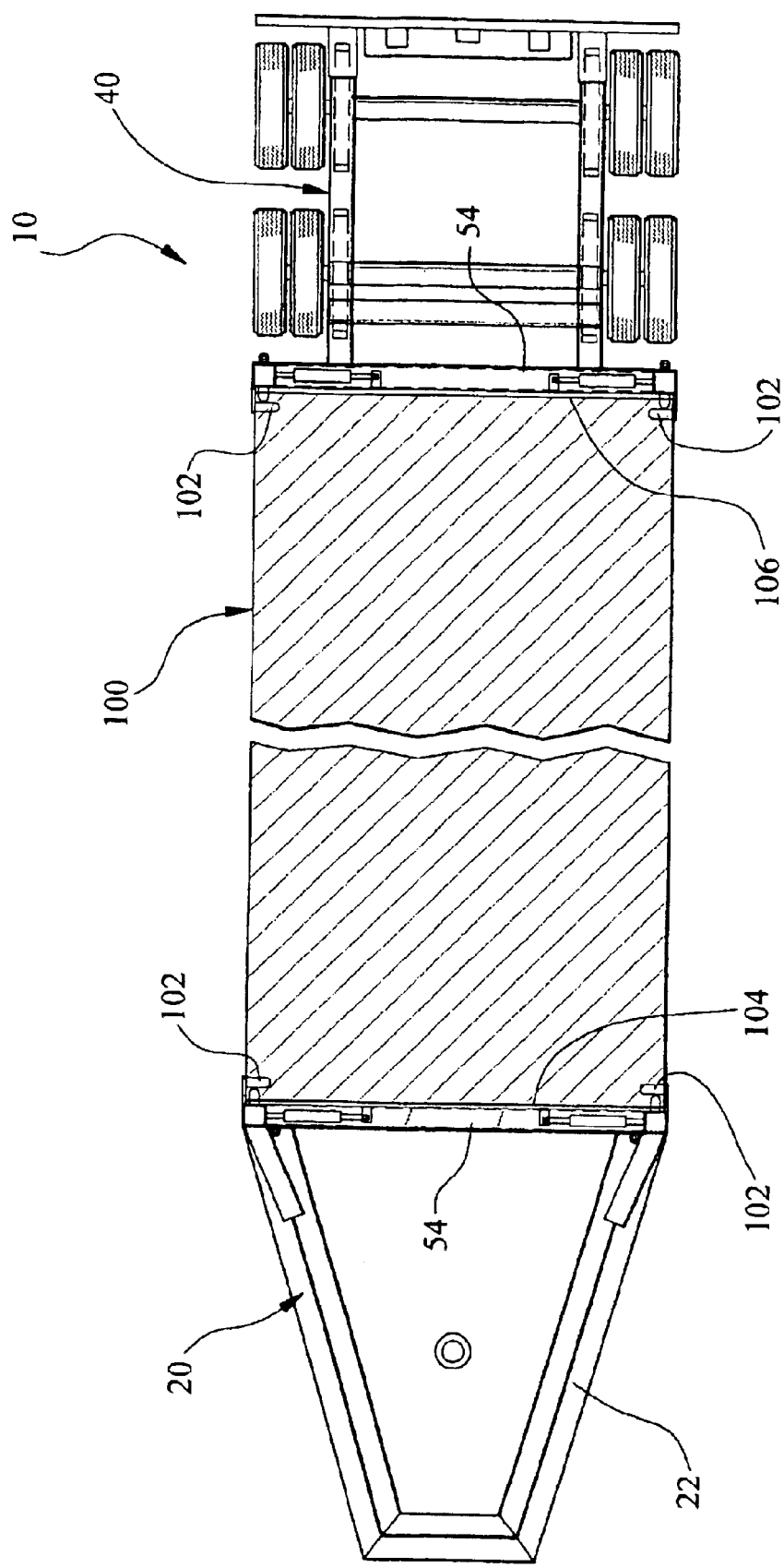
FIG. 2 is a top plan view showing the front and rear units attached to the respective forward and rear ends of the shipping container.

Referring to the several views of the drawings, and initially FIG. 1, the container transport apparatus is shown and is generally indicated as 10. As seen in FIG. 1, the container transport apparatus 10 includes a front unit 20 and a rear unit 40 which attach to opposite forward and rear ends 104, 106, respectively, of a shipping container 100 so that the shipping container can be lifted and supported above the ground for transport. The individual front and rear units 20, 40 attach to corner sockets 102 on the opposite ends of the shipping container using locking pins. More specifically, both the front and rear units include frame structures 22, 42, respectively, which support a lifting assembly 30. Each lifting assembly includes opposite left and right elongate vertical members 44 slidably fitted through a vertical support 46. The opposite end portions of the vertical members define upper and lower arms 50, 52. In a preferred embodiment, the upper and lower arms 50, 52 on both the front and rear units 20, 40 are hydraulically operated to move vertically up and down. The frame structures 22, 42 further include upper and lower horizontal cross arm supports 54,56 which fix the vertical supports 46 in spaced parallel relation so that the left and right elongate vertical members, including the upper and lower arms 50, 52, are maintained spaced apart the distance of the width of the container.

Figure 9:
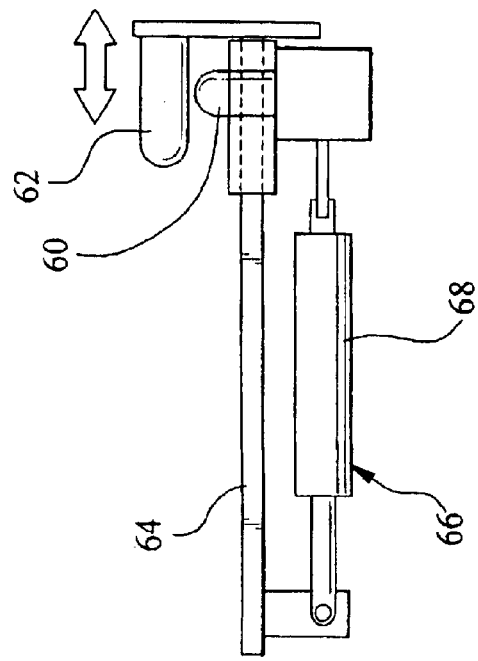
FIG. 9 is an isolated top plan view of a hydraulic locking mechanism provided on the lifting assemblies of both the front and rear units.
Figure 8:
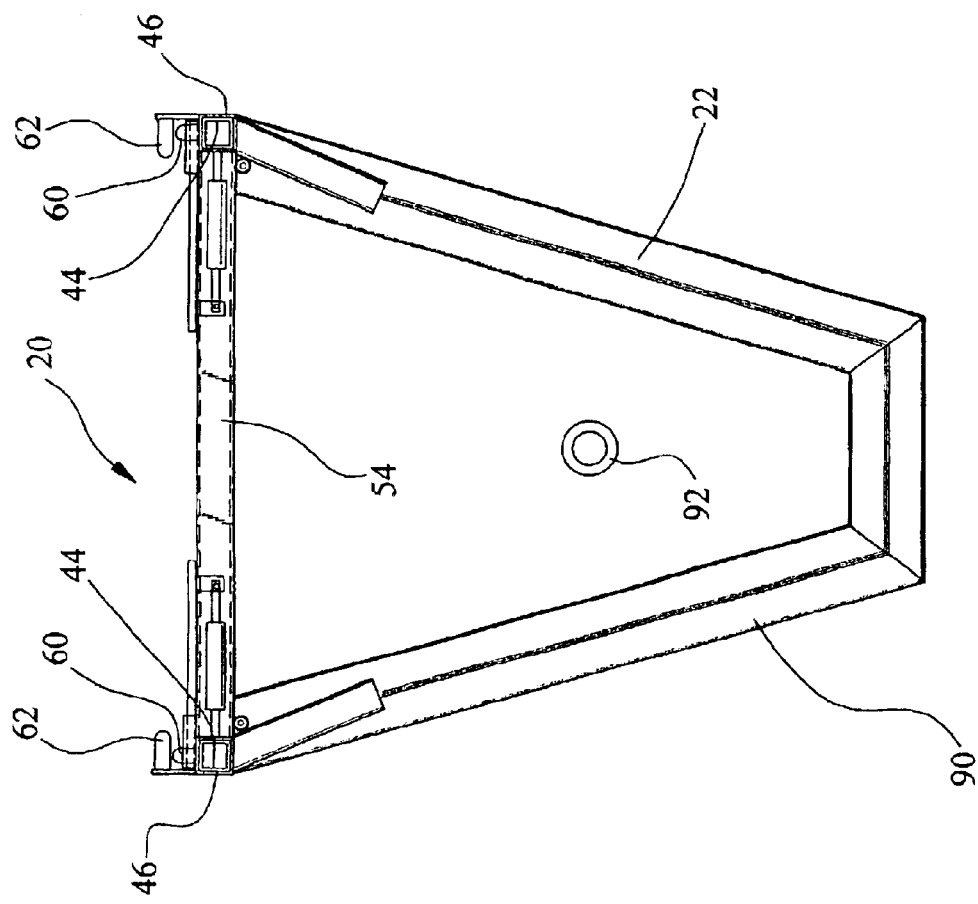
FIG. 8 is a top plan view of the front unit.

To attach the front and rear units 20, 40 to the container 100, each unit is moved into position against the respective opposite ends 104, 106 of the shipping container 100 until fixed pins 60 on the upper and lower arm members 50, 52 are received within the respective corner sockets 102 of the shipping container 100. Movable locking pins 62 are further provided on the upper and lower arm members 50, 52 of the lifting assemblies 30 of both the front and rear units 20, 40. The movable locking pins 62 are provided on telescopically extending horizontal members 64 and are positioned and disposed for receipt within side socket openings of the corner sockets 102 on the shipping container, at both the front and rear ends 104, 106. The telescopically extending members 64 are moveably operated by hydraulic locking mechanisms 66 (as shown in FIG. 9). The hydraulic locking mechanisms 66 are provided with cylinders 68 which permit hydraulic, telescopic movement between an extended position wherein the locking pins 62 are removed from the sockets 102 of the container 100, and a retracted position wherein the movable locking pins 62 are received within the corner sockets 102. When moving the front and rear units 20, 40 into position against the respective opposite ends 104, 106 of the shipping container, the removable locking pins 62 and the telescopically extending members 64 are maintained in the outboard extended position, so that the movable locking pins are able to clear the side edges of the container as the upper and lower arm members 50, 52 and fixed pins 60 move against the opposite end faces of the shipping container, with the fixed pins being received within the respective front and rear end corner socket openings. At this point, the moving locking pins 62 are hydraulically operated to the retracted position, causing the moving locking pins 62 to be received within the corner socket openings on the sides of the container 100, at both the front and rear ends 104, 106. The container 100 can then be lifted vertically from the ground, using hydraulic power to move the vertical members 44 of the lifting assembly 30 upward, without tilting the container either forwardly or rearwardly. Specifically, the container is lifted and maintained level so that the contents within the container do not shift and become damaged.

Figures 3, 4:
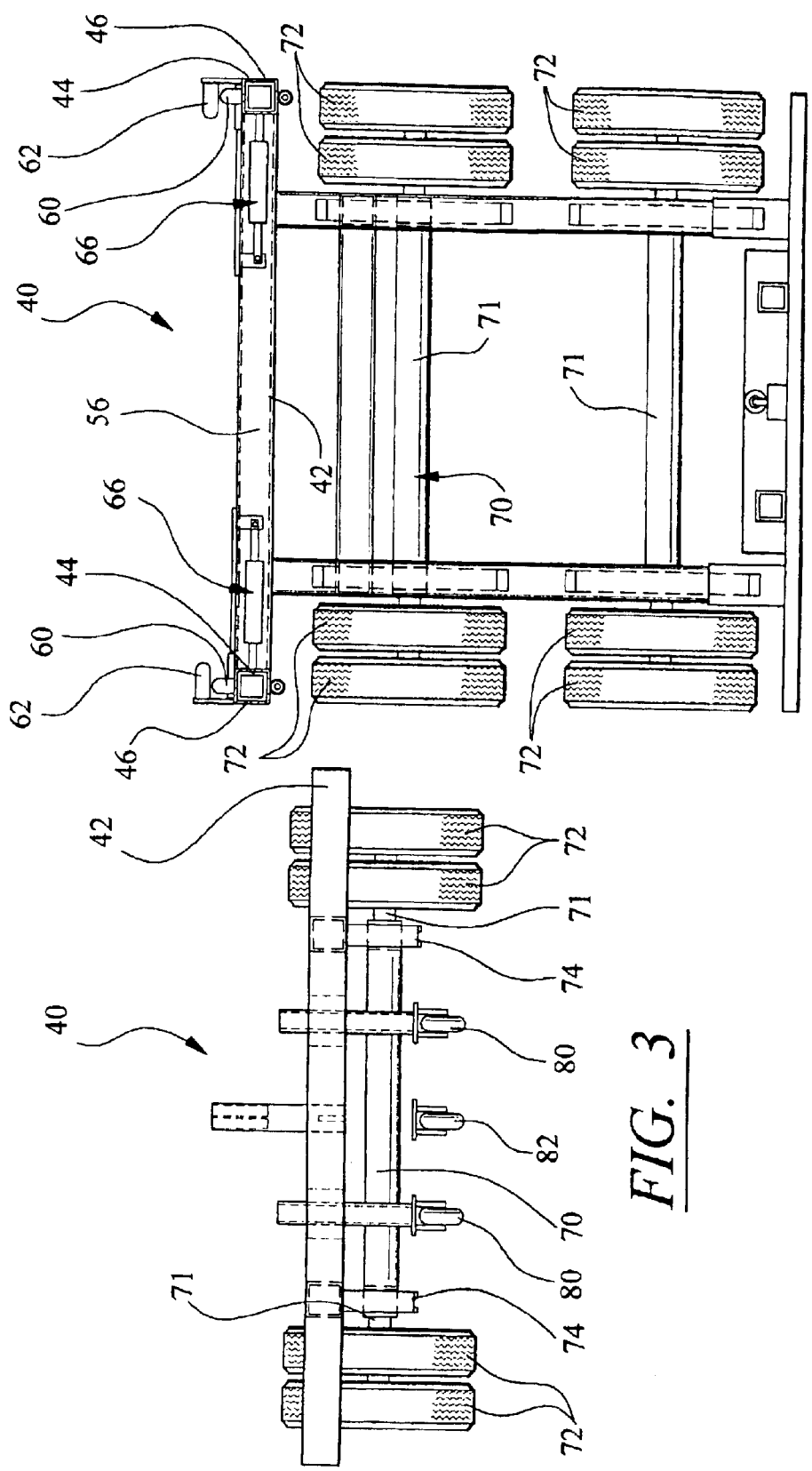
FIG. 3 is a rear end elevational view of the rear unit of the container transport apparatus.
FIG. 4 is a top plan view of the rear unit of the apparatus.
Figure 5:
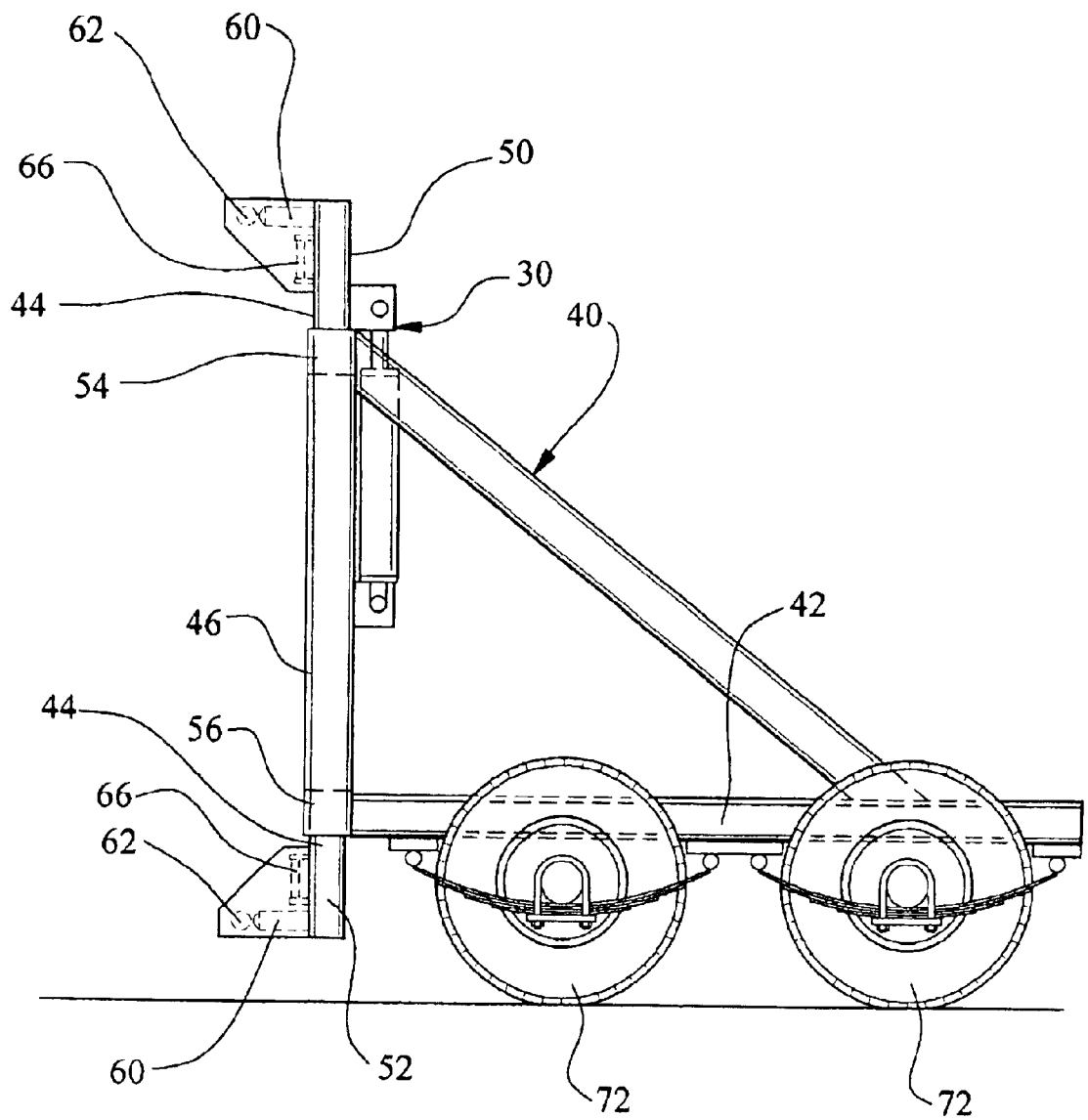
FIG. 5 is a side elevational view of the rear unit shown with the lifting assembly in a raised position.
Figure 6:
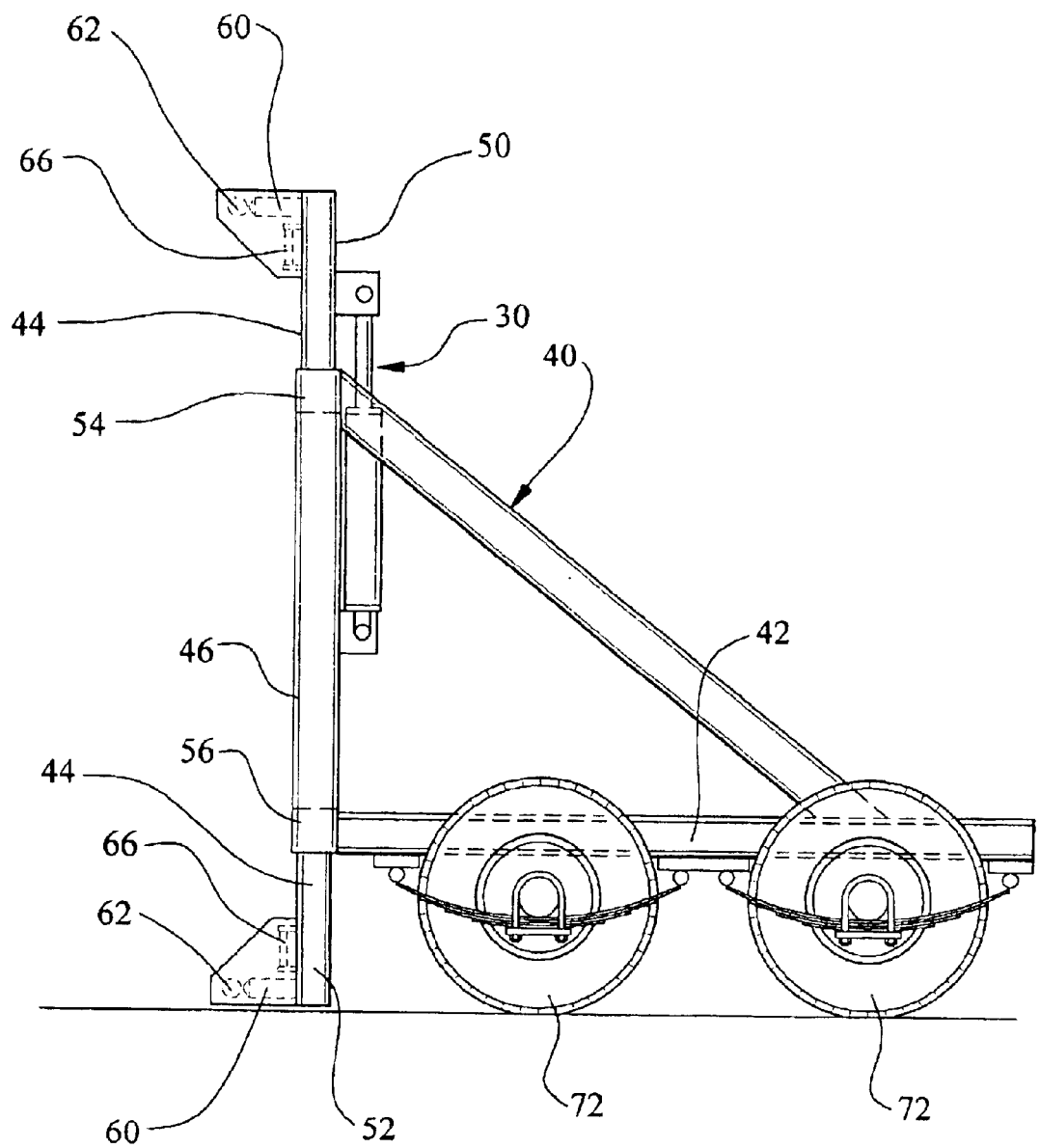
FIG. 6 is a side elevational view of the rear unit shown with the lifting assembly in a lowered position.
Figure 7:
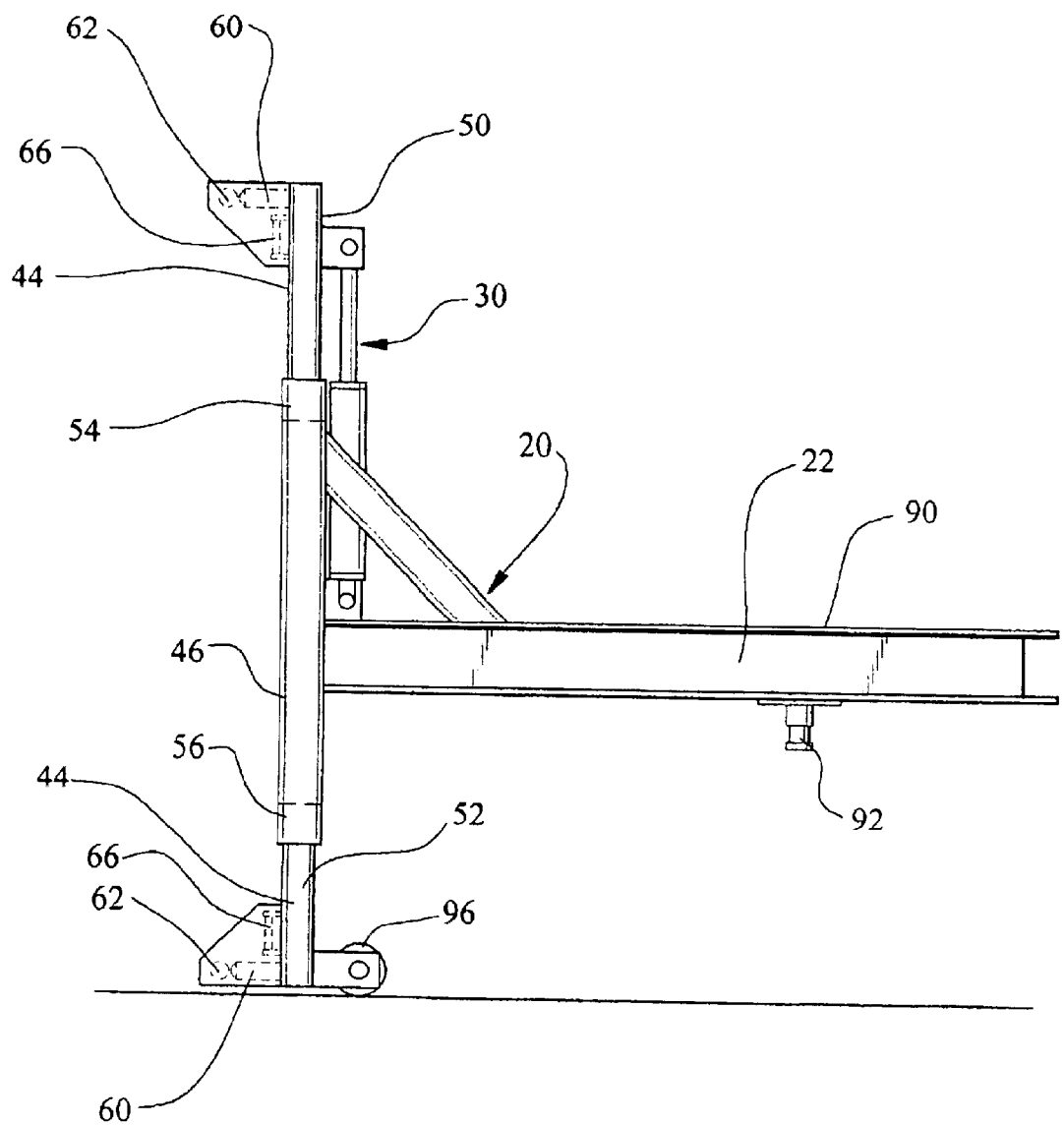
FIG. 7 is a side elevational view of the front unit shown with the lifting assembly in the lowered position.

Referring to FIGS. 3 and 4, the rear unit 40 includes a chassis 70 supporting the frame structure 42 and lifting assembly 30. The chassis 70 includes a pair of transverse axles 71 with ground engaging inflated road tires 72 at each of the opposite ends. Shock absorbing leaf springs 74 are provided to facilitate attachment of the axle to the frame structure in a manner which permits vertical shock-absorbing movement of the wheels and axle relative to the frame structure 42.

The frame structure of the front unit 20 is configured to define a forwardly extending trailer tongue 90 which is fitted with a hitch post 92 or like fitting for attachment to a bumper hitch of a towing vehicle. The bottom end of each vertical member 44 on the front unit 20 is provided with a wheel 96 for maintaining the locking pins 60, 62 on the lower arm 52 in alignment with the socket holes of the container while further assisting movement of the front unit 20 into position against the forward end 104 of the container 100.

Figure 10:
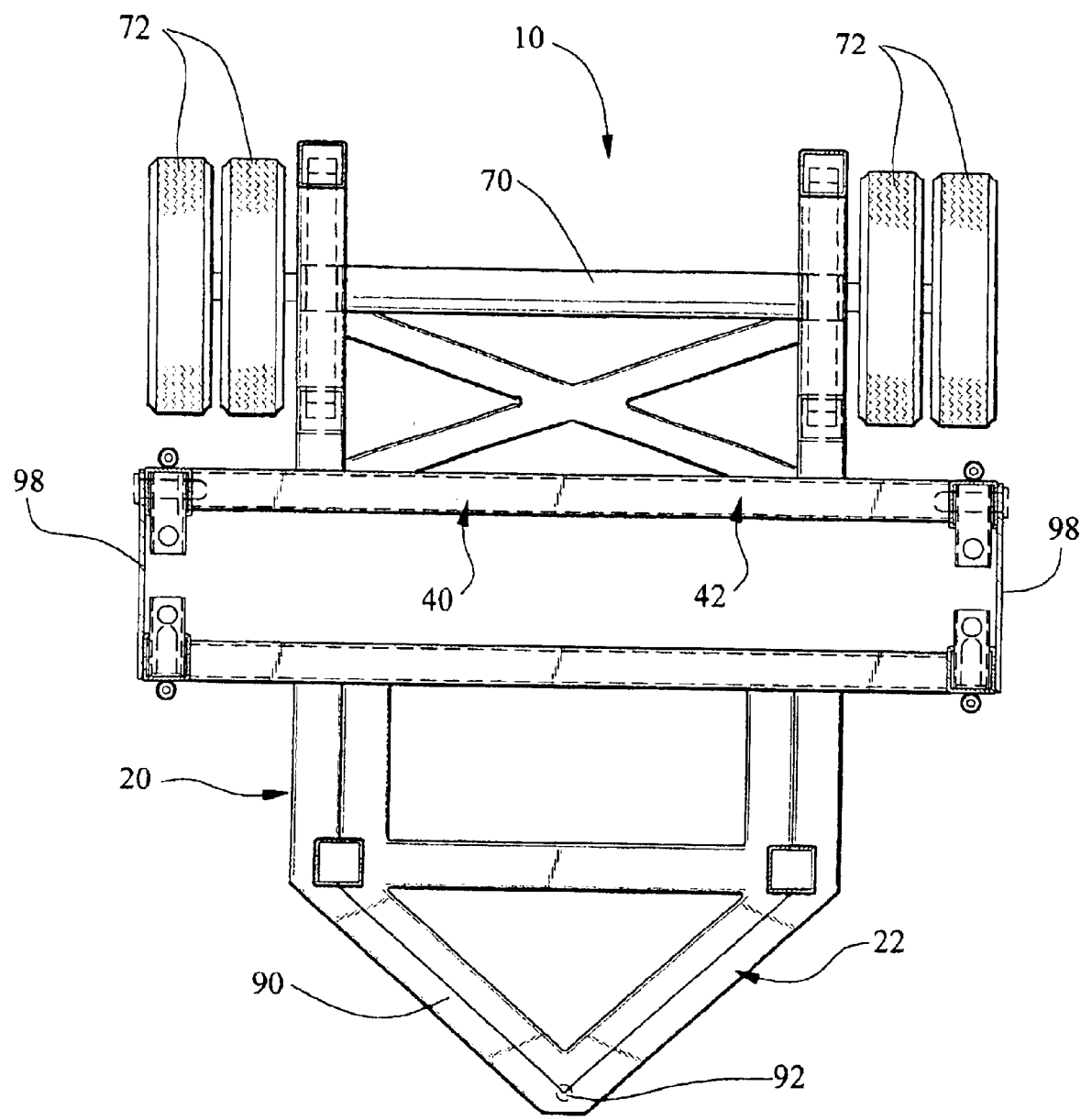
FIG. 10 is a top plan view of the front and rear units shown coupled together for towing as a single unit without a shipping container.
Figure 11:
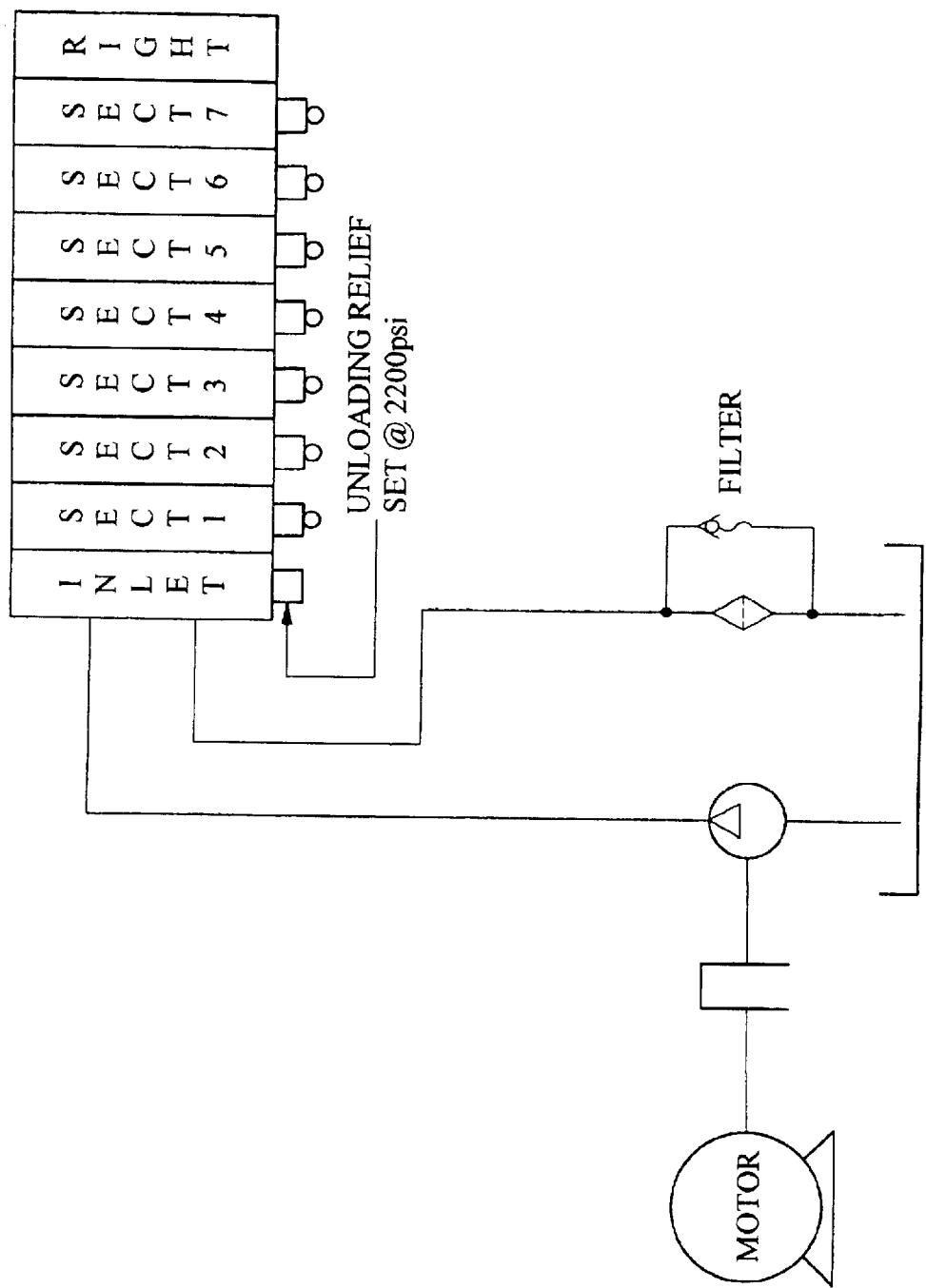
FIG. 11 is a schematic diagram of the hydraulic system on the rear unit.

As seen in FIG. 10, the front and rear units 20, 40 can be connected to one another using connecting plates 98 and locking pins 99 which fit to vertical posts of the respective frame members of the front and rear units. In this manner, the front and rear units 20, 40 can be towed as a single unit when not being used for transporting a container.

Figure 17:
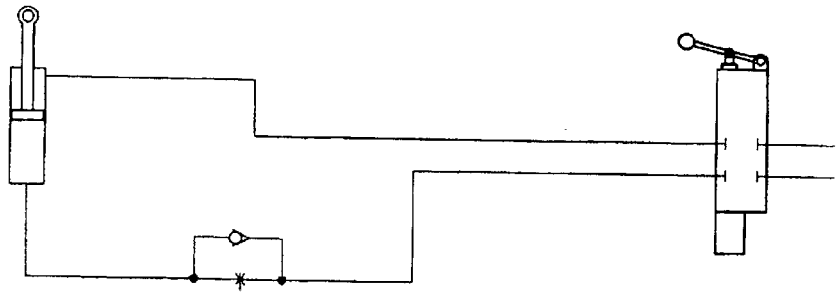
FIG. 17 is an isolated schematic diagram showing the hydraulic steering system forming a part of the hydraulic system of FIG. 11.
Figure 16:
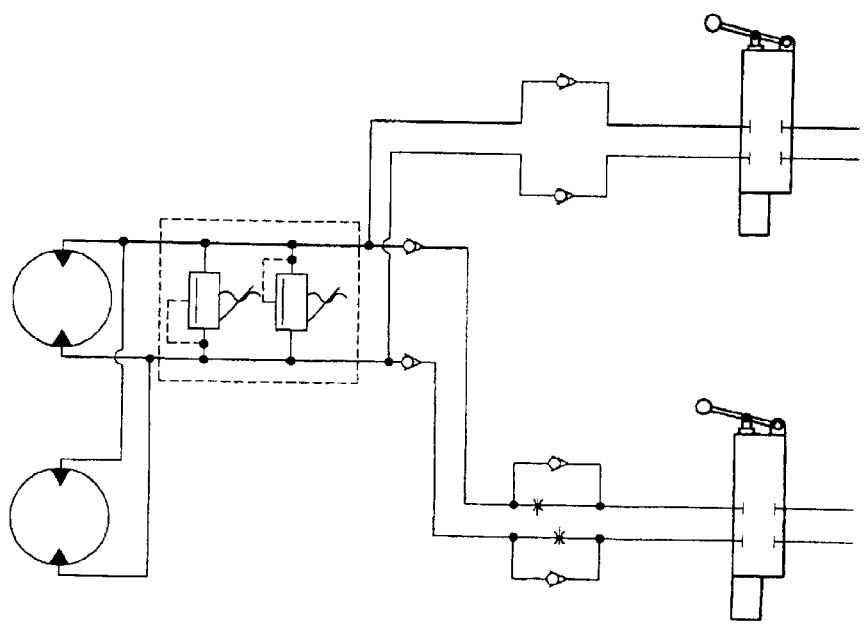
FIG. 16 is an isolated schematic diagram showing the hydraulic drive wheel system forming a part of the hydraulic system of FIG. 11.
Figure 18:
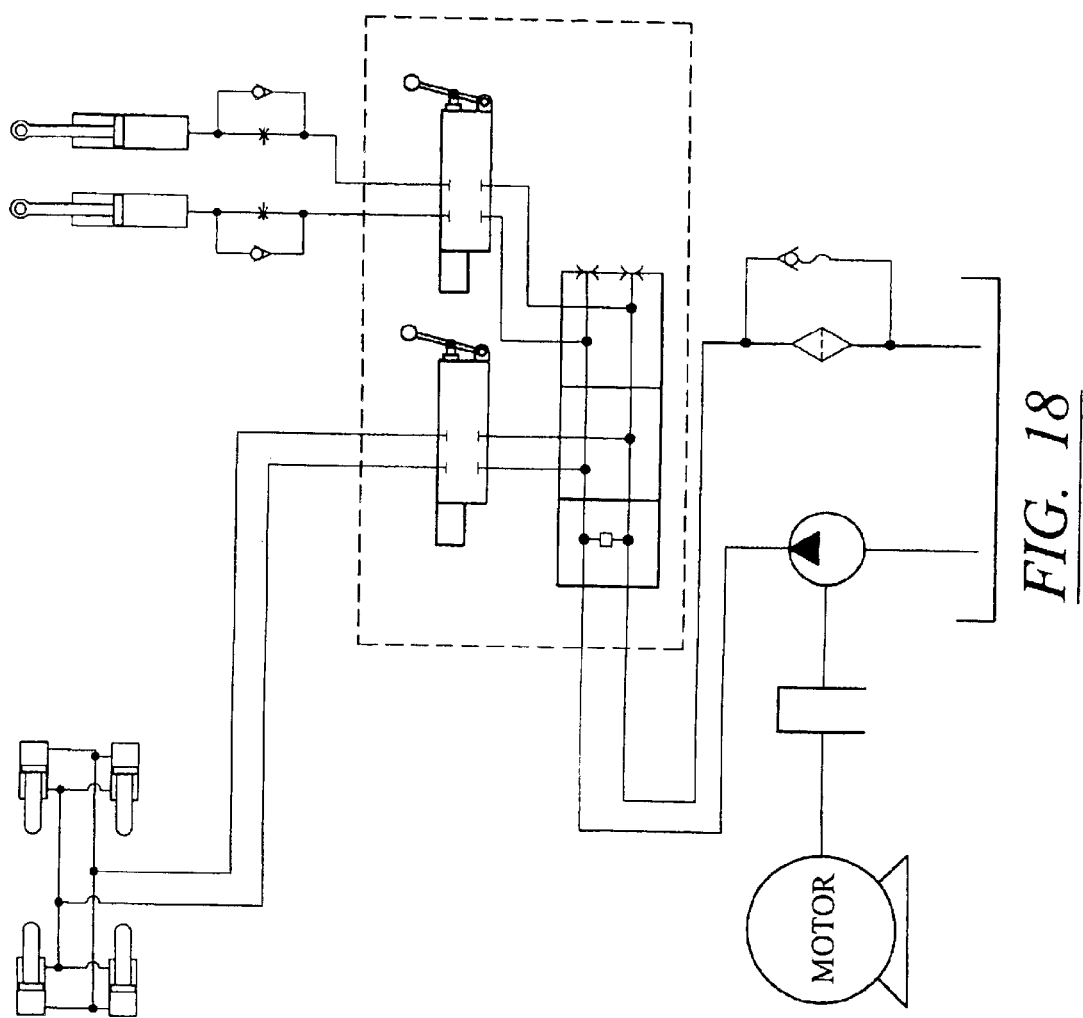
FIG. 18 is a schematic diagram showing the hydraulic lift system on the front unit of the container transport apparatus in accordance with a preferred embodiment thereof.

Referring to FIGS. 3, 16 and 17, a hydraulically driven drive wheel and steering wheel system is provided on the rear unit 40. Specifically, drive wheels 80 are supported on the underside of the frame structure 42 and are operable between a raised position, as seen in FIG. 3, and a lowered position to engage the ground in a manner which lifts the inflated road tires 72 off of the ground. The drive wheels 80 are lowered by the hydraulic drive wheel lift system, as shown schematically in FIG. 14. Once lowered, the hydraulic drive wheel system is driven hydraulically by the system shown schematically in FIG. 16. A separate steering wheel 82 is supported on the underside of the chassis, preferably forward of the drive wheels 80, and is hydraulically operated between the raised position, as seen in FIG. 3, and a lowered position in the same manner as described in connection with the drive wheels 80, to thereby lift the inflated road tires 72 off of the ground so that the entire rear unit 40 is supported on the drive wheels 80 and steering wheel 82. The hydraulically operated steering wheel lift system, which raises and lowers the steering wheel 82, is shown schematically in FIG. 15. The hydraulic steering system, which turns the steering wheel to guide the direction of the rear unit 40, is shown schematically in FIG. 17.

In a preferred embodiment, the hydraulic drive wheel system and hydraulic steering system are operated remotely, to maneuver the rear unit 40 into position against the rear end of the shipping container so that the shipping container can be lifted for transport. Moreover, the hydraulic drive wheel system and hydraulic steering system enable the rear unit to be separated and removed from the shipping container once the shipping container is placed on the ground at its destination. More generally, the hydraulic drive wheel system and hydraulic steering system allow the rear unit 40 to be moved and maneuvered when separated from the shipping container.

While the instant invention has been shown and described in accordance with a preferred and practical embodiment thereof, it is recognized that departures from the instant disclosure are contemplated within the spirit and scope of the present invention.

What is claimed is:

1. A transport apparatus for transporting a shipping container having a forward end and a rear end and wherein the forward and rear ends of the shipping container are provided with corner sockets on all corners, including two upper corners and two lower corners, said apparatus comprising:

a front unit including a frame structure;

a rear unit including a frame structure;

a lifting assembly supported on said frame structure of each of said front unit and said rear unit, said lifting assembly comprising:

upper and and lower vertical arm members moveable between a raised position and a lowered position and each of said upper and lower vertical arm members including a fixed locking pin extending therefrom, each locking pin being structured and disposed for releasable receipt within a respective one of said corner sockets on the forward and rear ends of the shipping container, respectively;

upper and lower horizontal arm members moveable horizontally between an outboard extended position and an inboard retracted position and each of said upper and lower horizontal arm members having an inboard facing locking pin fixed to an outboard distal end thereof;

hydraulic drive means for moving said upper and lower vertical arm members between said raised position and said lowered position and for moving said upper and lower horizontal arm members between said outboard extended position and said inboard retracted position; and said inboard facing locking pins on said upper and lower horizontal arm members being structured and disposed for interlocking, releasable receipt within respective ones of the corner sockets at the forward and rear ends of the shipping container, respectively;

at least one wheel on said front unit for permitting movement of said front unit on a ground surface;

a chassis on said rear unit for supporting said frame structure and said lifting assembly, said chassis including at least one transverse axel having ground engaging tires rotatably supported at opposite ends thereof;

hydraulically operated drive wheels supported on an underside of said frame structure of said rear unit and operable between a raised position and a lowered position, said drive wheels being structured and disposed to engage the ground surface when operated to said lowered position to thereby lift the tires off of the ground, and said drive wheels being structured and disposed to be hydraulically driven to move said rear unit along said ground surface; and a steering wheel supported on an underside of said chassis, said steering wheel being hydraulically operable between a raised position and a lowered position, and said steering wheel engaging the ground surface when in said lowered position for controlling directional movement of said rear unit upon hydraulically driven operation of said drive wheels, thereby permitting maneuvering of said rear unit along the ground surface.

2. A transport apparatus for transporting a shipping container having a forward end and a rear end and wherein the forward and rear ends of the shipping container are provided with corner sockets on all corners, including two upper corners and two lower corners, said apparatus comprising:

a front unit including a frame structure;

a rear unit including a frame structure;

a lifting assembly supported on said frame structure of each of said front unit and said rear unit, said lifting assembly comprising:

upper and and lower vertical arm members moveable between a raised position and a lowered position and each of said upper and lower vertical arm members including a fixed locking pin extending therefrom, each locking pin being structured and disposed for releasable receipt within a respective one of said corner sockets on the forward and rear ends of the shipping container, respectively;

upper and lower horizontal arm members moveable horizontally between an outboard extended position and an inboard retracted position and each of said upper and lower horizontal arm members having an inboard facing locking pin fixed to an outboard distal end thereof;

hydraulic drive means for moving said upper and lower vertical arm members between said raised position and said lowered position and for moving said upper and lower horizontal arm members between said outboard extended position and said inboard retracted position; and said inboard facing locking pins on said upper and lower horizontal arm members being structured and disposed for interlocking, releasable receipt within respective ones of the corner sockets at the forward and rear ends of the shipping container, respectively;

at least one wheel on said front unit for permitting movement of said front unit on a ground surface;

a plurality of wheels on said rear unit, including a steering wheel for permitting maneuvering and transport of said rear unit along the ground surface.

* * * * *